United States Patent
Lee

(10) Patent No.: US 10,244,427 B2
(45) Date of Patent: Mar. 26, 2019

(54) SYSTEMS AND METHODS FOR SUPPRESSING AND/OR CONCEALING BANDWIDTH REDUCTION OF VOIP VOICE CALLS

(71) Applicant: LINE Corporation, Shibuya-ku, Tokyo (JP)

(72) Inventor: Dongwon Lee, Seongnam-si (KR)

(73) Assignee: LINE Corporation, Tokyo (JP)

(*) Notice: Subject to any disclaimer, the term of this patent is extended or adjusted under 35 U.S.C. 154(b) by 162 days.

(21) Appl. No.: 15/190,519

(22) Filed: Jun. 23, 2016

(65) Prior Publication Data

US 2017/0013503 A1 Jan. 12, 2017

(30) Foreign Application Priority Data

Jul. 9, 2015 (KR) .................. 10-2015-0097882

(51) Int. Cl.
*H04W 28/02* (2009.01)
*H04L 12/825* (2013.01)
*H04W 80/04* (2009.01)

(52) U.S. Cl.
CPC ......... *H04W 28/0289* (2013.01); *H04L 47/25* (2013.01); *H04W 28/0231* (2013.01); *H04W 80/04* (2013.01)

(58) Field of Classification Search
CPC .............. H04L 47/25; H04W 28/0231; H04W 28/0289; H04W 80/04; H01Q 15/16; H01Q 19/10; H01Q 1/42; H01Q 1/428; H01Q 3/14; H01Q 3/20
See application file for complete search history.

(56) References Cited

U.S. PATENT DOCUMENTS

| | | | | |
|---|---|---|---|---|
| 7,643,414 B1* | 1/2010 | Minhazuddin | ........ | H04L 47/822 370/230 |
| 2003/0074674 A1* | 4/2003 | Magliaro | ............. | H04N 7/15 725/118 |
| 2003/0095572 A1* | 5/2003 | Efthymiou | ........... | H04L 1/0002 370/468 |
| 2004/0243402 A1* | 12/2004 | Ozawa | ................ | G10L 21/038 704/208 |
| 2006/0149538 A1* | 7/2006 | Lee | .................... | G10L 19/0204 704/219 |
| 2008/0004866 A1* | 1/2008 | Virolainen | ........... | G10L 19/008 704/205 |
| 2008/0025300 A1* | 1/2008 | Lide | ................. | H04L 29/06027 370/389 |

(Continued)

FOREIGN PATENT DOCUMENTS

KR       20150097882 A       8/2015

*Primary Examiner* — Dung B Huynh
(74) *Attorney, Agent, or Firm* — Harness, Dickey & Pierce, P.L.C.

(57) ABSTRACT

A system and method for concealing bandwidth reduction of a VoIP call voice is provided. In a method for dynamic bandwidth extension during a call session between a first transceiver device and a second transceiver device, the first transceiver device compares a bit rate of received packet data with a threshold bit rate, and the first transceiver device determines whether to perform bandwidth extension during the call session based on the comparison. The bit rate is controlled based on a degree of network congestion between the first transceiver device and the second transceiver device.

18 Claims, 9 Drawing Sheets

(56) References Cited

U.S. PATENT DOCUMENTS

| | | | | |
|---|---|---|---|---|
| 2008/0031205 A1* | 2/2008 | Kahola | H04L 12/40182 | 370/338 |
| 2008/0134005 A1* | 6/2008 | Izzat | H04L 1/0009 | 714/774 |
| 2010/0063806 A1* | 3/2010 | Gao | G10L 19/022 | 704/207 |
| 2010/0266080 A1* | 10/2010 | Akita | H04L 7/10 | 375/362 |
| 2010/0284278 A1* | 11/2010 | Alanara | H04L 47/11 | 370/235 |
| 2010/0318352 A1* | 12/2010 | Taddei | G10L 19/012 | 704/226 |
| 2011/0170408 A1* | 7/2011 | Furbeck | H04L 47/10 | 370/230 |
| 2011/0172998 A1* | 7/2011 | Nystrom | G10L 19/12 | 704/229 |
| 2012/0162348 A1* | 6/2012 | Choi | H04L 1/0014 | 348/14.02 |
| 2012/0218887 A1* | 8/2012 | Khilnani | H04L 43/0876 | 370/230 |
| 2013/0018660 A1* | 1/2013 | Qi | G10L 19/002 | 704/500 |
| 2013/0060958 A1* | 3/2013 | Keum | H04N 21/2668 | 709/231 |
| 2013/0121147 A1* | 5/2013 | Tapia | H04W 28/0289 | 370/230 |
| 2013/0157674 A1* | 6/2013 | Jylha-Ollila | H04W 8/24 | 455/450 |
| 2013/0317812 A1* | 11/2013 | Jeong | G10L 19/0212 | 704/203 |
| 2013/0329130 A1* | 12/2013 | Gupta | H04N 5/21 | 348/497 |
| 2013/0332620 A1* | 12/2013 | Gahm | H04N 21/23805 | 709/231 |
| 2014/0192799 A1* | 7/2014 | Huang | H04L 47/808 | 370/352 |
| 2014/0233725 A1* | 8/2014 | Kim | H04M 9/08 | 379/414 |
| 2014/0269326 A1* | 9/2014 | Westin | H04L 47/10 | 370/237 |
| 2014/0280679 A1* | 9/2014 | Dey | H04L 67/2842 | 709/213 |
| 2014/0337473 A1* | 11/2014 | Frusina | H04L 5/003 | 709/217 |
| 2015/0073784 A1* | 3/2015 | Gao | G10L 19/0204 | 704/223 |
| 2015/0112692 A1* | 4/2015 | Kim | G10L 21/038 | 704/500 |
| 2016/0057416 A1* | 2/2016 | Hiriyannaiah | G06F 19/3418 | 375/240.02 |
| 2016/0112884 A1* | 4/2016 | Hassan | H04B 17/318 | 370/328 |
| 2016/0127215 A1* | 5/2016 | Mani | H04M 15/56 | 370/252 |
| 2016/0219088 A1* | 7/2016 | Ma | H04L 65/605 | |
| 2016/0254959 A1* | 9/2016 | Arndt | H04L 41/0816 | 370/235 |
| 2016/0286267 A1* | 9/2016 | Tang | H04N 21/2383 | |
| 2016/0359942 A1* | 12/2016 | Li | H04L 65/80 | |

* cited by examiner

SYSTEMS AND METHODS FOR SUPPRESSING AND/OR CONCEALING BANDWIDTH REDUCTION OF VOIP VOICE CALLS

CROSS-REFERENCE TO RELATED APPLICATIONS

This application claims priority under 35 U.S.C. § 119 to Korean Patent Application No. 10-2015-0097882, filed Jul. 9, 2015, in the Korean Intellectual Property Office, the entire contents of which are hereby incorporated by reference.

BACKGROUND

Field

One or more example embodiments of inventive concepts described herein relate to systems and/or methods for suppressing and/or concealing bandwidth reduction of Voice over Internet Protocol (VoIP) voice calls.

Description of Related Art

A voice over internet protocol (VoIP) call may be served through a variety of communication networks, including a code division multiple access (CDMA) network, a wideband CDMA (WCDMA) network, a long term evolution (LTE) network, a wireless fidelity (Wi-Fi) network, and a wireless broadband (Wibro) network. Generally, characteristics such as a data throughput, jitter, and delay are different in each of these communication networks. Moreover, these characteristics frequently change based on network traffic conditions. As a result, it may be relatively difficult to send real-time voice data smoothly through the Internet. Additionally, the resulting interruption, stop, and/or delay of voice due may cause of deterioration in VoIP call quality.

Related art VoIP systems include a network congestion control function for more smoothly sending voice data through these types networks. In one example, a VoIP system adjusts a size of a packet based on network conditions, and sends the adjusted packet to reduce and/or minimize deterioration in sound quality. However, a basic, related art algorithm of this network congestion control function may not be sufficient to avoid a change from related art high definition (HD) voice (wideband (WB)) sound quality to standard definition (SD) voice (narrow band (NB)) sound quality. In other words, even when using related art network congestion control functions, a user may still suffer from reduced sound quality (e.g., bandwidth reduction) from the HD voice to the SD voice during a call connection.

For example, related art network congestion control functions focus on sending packets more smoothly, but do not take into account deterioration in sound quality.

A related art artificial bandwidth extension (ABE) algorithm is a technology for extending voice quality from the NB to the WB at the start of a call connection. However, after a call connection begins, the use (or the turning on/off) of the ABE algorithm is not controlled.

SUMMARY

Example embodiments of inventive concepts provide systems and/or methods for improving Voice over Internet Protocol (VoIP) call quality by suppressing and/or concealing bandwidth reduction, which occurs during a VoIP call connection, using an ABE algorithm for synthesizing sound quality of an high-definition (HD) voice again from sound quality of an standard-definition (SD) voice.

At least one example embodiment provides a method for dynamic bandwidth extension during a call session between a first transceiver device and a second transceiver device, the method comprising: comparing, at the first transceiver device, a bit rate of received packet data with a threshold bit rate, the bit rate controlled based on a degree of network congestion between the first transceiver device and the second transceiver device; and determining, at the first transceiver device, whether to perform bandwidth extension during the call session based on the comparison.

According to at least some example embodiments, the received packet data may be transmitted from the second transceiver device to the first transceiver device. The method further may further include: detecting the degree of network congestion based on the received packet data; determining, by the first transceiver device, a bit rate for subsequent packet data transmissions by the second transceiver device based on the detected degree of network congestion; sending, by the first transceiver device, the determined bit rate to the second transceiver device; and receiving, at the first transceiver device, the subsequent packet data transmissions from the second transceiver device at the determined bit rate.

The method may further include: generating, by the first transceiver device, a value quantifying the detected degree of network congestion. The determining a bit rate for subsequent packet data transmissions may include: decreasing the bit rate for the subsequent packet data transmissions if the generated value is greater than a threshold value; and increasing the bit rate for the subsequent packet data transmissions if the generated value is less than the threshold value.

The method may further include controlling the bit rate based on the degree of network congestion; and verifying the controlled bit rate based on subsequent packet data transmissions received from the second transceiver device at the controlled bit rate.

The method may further include: detecting the degree of network congestion during the call session; generating information about the degree of network congestion; and sending the generated information to the second transceiver device for controlling the bit rate for subsequent packet data transmissions during the call session based on the generated information about the degree of network congestion.

The method may further include selecting a mode for suppressing noise in packet data transmissions based on a comparison between the bit rate and a bit rate for narrow band transmissions. The selecting may select a maximum noise suppression level if the bit rate is less than the bit rate for narrow band transmissions.

The method may further include extending a bandwidth by activating an artificial bandwidth extension (ABE) at the first transceiver device, if the bit rate of the received packet data is greater than or equal to the threshold bit rate.

At least one other example embodiment provides a method for dynamic bandwidth extension during a call session between a first transceiver device and a second transceiver device, the method comprising: receiving, at the first transceiver device during the call session, a bit rate for packet data transmissions to the second transceiver device during the call session, the bit rate controlled based on a degree of network congestion between the first transceiver device and the second transceiver device; generating, by the first transceiver device, packet data at the received bit rate; and sending, by the first transceiver device, the generated packet data to the second transceiver device; wherein during the call session, the second transceiver device determines whether to perform bandwidth extension based on a bit rate of the generated packet data.

According to at least some example embodiments, the method may further include: controlling, by the second transceiver device, the bit rate based on the degree of network congestion; and wherein the bit rate for packet data transmissions is received from the second transceiver device.

The method may further include receiving information about the degree of network congestion from the second transceiver device during the call session; and wherein the controlling controls the bit rate based on the received information.

The information about the degree of network congestion may include a value of a factor quantifying the degree of network congestion. The controlling the bit rate may include: decreasing the bit rate if the value of the factor is greater than a threshold value; and increasing the bit rate if the value of the factor is less than the threshold value.

The method may further include: selecting, by the first transceiver device, a mode for noise suppression based on a comparison between the bit rate and a threshold bit rate for narrow band transmissions; wherein the selecting selects a maximum noise suppression mode if the bit rate is less than the threshold bit rate.

The method may further include: extending a bandwidth by activating an artificial bandwidth extension (ABE) if the bit rate of the generated packet data is greater than or equal to a threshold bit rate for narrow band transmissions.

At least one other example embodiment provides an electronic device comprising: a transceiver; and one or more processors coupled to the transceiver. The one or more processors are configured to execute computer-readable instructions, such that the one or more processors are configured to: compare, during a call session with at least one other electronic device, a bit rate of received packet data with a threshold bit rate, the bit rate controlled based on a degree of network congestion between the electronic device and the at least one other electronic device; and determine whether to perform bandwidth extension during the call session based on the comparison.

The one or more processors are configured to execute the computer-readable instructions such that the one or more processors may be further configured to: detect the degree of network congestion based on the received packet data; and determine a bit rate for subsequent packet data transmissions by the at least one other electronic device based on the detected degree of network congestion. The transceiver may be further configured to: send the determined bit rate to the at least one other electronic device; and receive subsequent packet data transmissions from the at least one other electronic device at the determined bit rate.

The one or more processors are configured to execute the computer-readable instructions such that the one or more processors may be further configured to: generate a value quantifying the detected degree of network congestion; decrease the bit rate for the subsequent packet data transmissions if the generated value is greater than a threshold value; and increase the bit rate for the subsequent packet data transmissions if the generated value is less than the threshold value.

The one or more processors are configured to execute the computer-readable instructions such that the one or more processors may be further configured to: control the bit rate based on the degree of the network congestion; and verify the controlled bit rate based on subsequent packet data received from the at least one other electronic device at the controlled bit rate.

The one or more processors are configured to execute the computer-readable instructions such that the one or more processors may be further configured to: detect the degree of network congestion during the call session; and generate information about the degree of network congestion. The transceiver may be further configured to send the generated information to the at least one other electronic device to control the bit rate for subsequent packet data transmissions during the call session based on the information about the degree of network congestion.

Noise suppression may be applied to the received packet data based on a comparison between the bit rate and a bit rate for narrow band transmissions. A maximum noise suppression level may be applied if the bit rate is less than the bit rate for narrow band transmissions.

The one or more processors are configured to execute the computer-readable instructions such that the one or more processors may be further configured to extend a bandwidth for the call session by activating an artificial bandwidth extension (ABE) if the bit rate of the received packet data is greater than or equal to the threshold bit rate.

BRIEF DESCRIPTION OF THE FIGURES

Example embodiments will become apparent from the following description with reference to the following figures, wherein like reference numerals refer to like parts throughout the various figures unless otherwise specified, and wherein.

DETAILED DESCRIPTION

Figure 1:
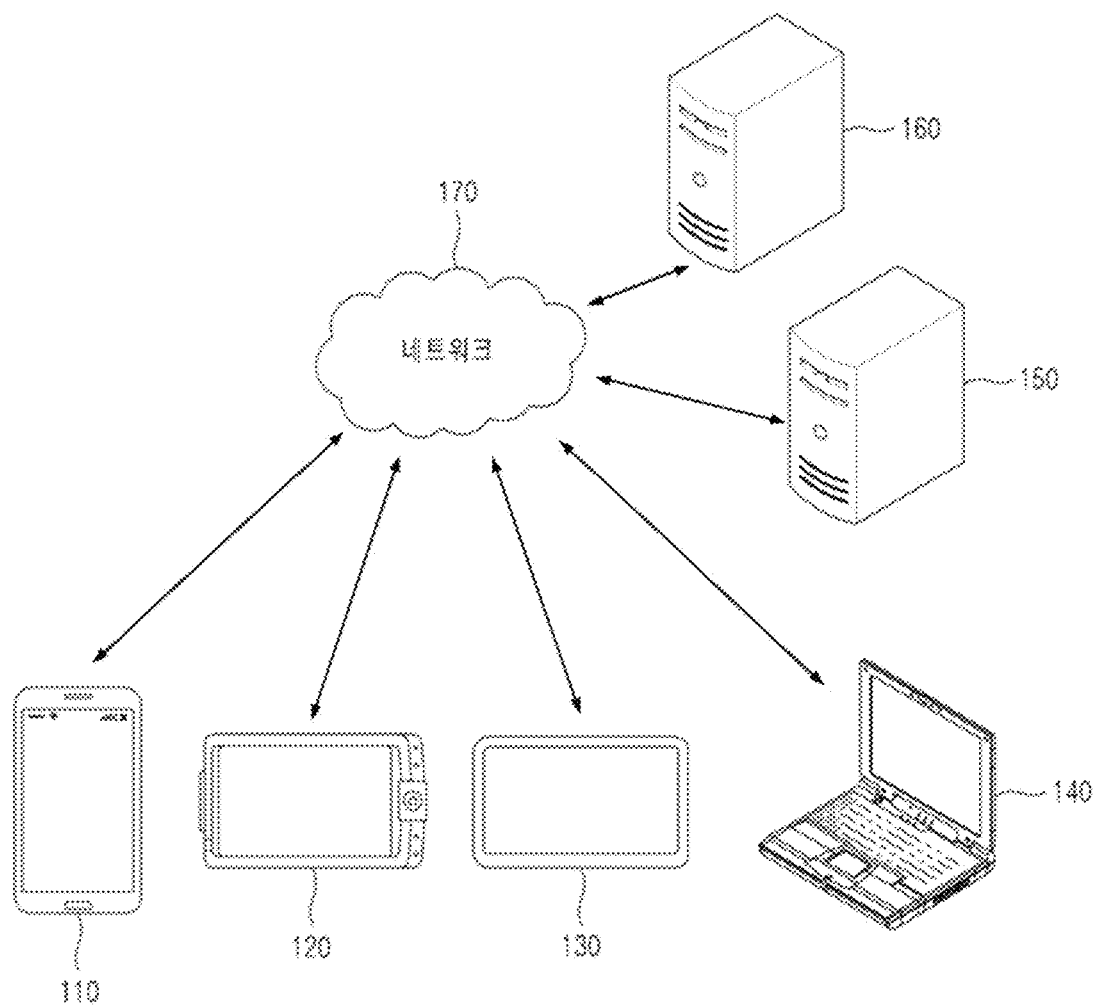
FIG. 1 is a drawing illustrating a network environment according to an example embodiment of inventive concepts.

One or more example embodiments will be described in detail with reference to the accompanying drawings. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

Although the terms "first," "second," "third," etc., may be used herein to describe various elements, components, regions, layers, and/or sections, these elements, components, regions, layers, and/or sections, should not be limited by these terms. These terms are only used to distinguish one element, component, region, layer, or section, from another region, layer, or section. Thus, a first element, component, region, layer, or section, discussed below may be termed a second element, component, region, layer, or section, without departing from the scope of this disclosure.

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed items. Expressions such as "at least one of," when preceding a list of elements, modify the entire list of elements and do not modify the individual elements of the list. Also, the term "example" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Units and/or devices according to one or more example embodiments may be implemented using hardware, software, and/or a combination thereof. For example, hardware devices may be implemented using processing circuity such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Hereinafter, a description will be given in detail for some example embodiments of inventive concepts with reference to the accompanying drawings. However, inventive concepts should not be limited by the example embodiments discussed herein. Also, with respect to the descriptions of the drawings, like reference numerals refer to like elements.

FIG. 1 is a drawing illustrating a network environment according to an example embodiment of inventive concepts. In FIG. 1, an example embodiment is exemplified as the network environment of FIG. 1 may include a plurality of electronic devices 110 to 140, a plurality of servers 150 and 160, and a network 170. However, the number of electronic devices and the number of servers may not be limited thereto.

Each of the electronic devices 110 to 140 may be a fixed terminal or a mobile terminal implemented with a computer system. For example, the plurality of electronic devices 110 to 140 may be a smart phone, a mobile phone, a navigation device, a computer, a notebook, a digital broadcasting terminal, a personal digital assistant (PDA), a portable multimedia player (PMP), a tablet personal computer (PC), and the like. For example, the electronic device 110 may communicate with the other electronic devices 120 to 140 and/or the servers 150 and 160 through the network 170 using a wired or wireless communication scheme.

The scope and sprit of inventive concepts may not be limited to the communication scheme. For example, there may be a communication scheme using a local area wireless communication network between devices as well as a communication scheme using a communication network (e.g., a mobile communication network, a wired internet, a wireless internet, and a broadcasting network), which may be included in the network 170. For example, the network 170 may include one or more of networks, such as a personal area network (PAN), a local area network (LAN), a campus area network (CAN), a metropolitan area network (MAN), a wide area network (WAN), a broadband network (BBN), and the Internet. Also, the network 170 may include, but is limited to, one or more of network topologies which include a bus network, a star network, a ring network, a mesh network, a star-bus network, a tree or hierarchical network, and the like.

Each of the servers 150 and 160 may be implemented with a device or a plurality of devices, which communicate with the plurality of electronic devices 110 to 140 through the network 170 to provide content for a service to the plurality of electronic devices 110 to 140.

For one example, the server 150 may provide a code for configuring a screen of the electronic device 110 to the electronic device 110 based on a request message of a user of the electronic device 110. In this case, the electronic device 110 may provide content to the user by configuring and displaying its screen using the provided code under control of an operating system (OS) and at least one program (e.g., a browser or a specific application) included in the electronic device 110.

For another example, the server 150 may send data for a streaming service to the electronic device 110 through the network 170. In this case, the electronic device 110 may reproduce and output content using data streamed under control of the OS and the at least one program included in the electronic device 110.

For another example, the server 150 may establish a communication session between the electronic device 110 and the electronic device 120, which access the server 150. In this case, the electronic devices 110 and 120 may receive a service, such as a chat service, a data transmit service, and/or a voice and/or video call service between the electronic devices 110 and 120, using the established communication session.

In another example embodiment, the plurality of electronic devices 110 to 140 may communicate with each other without intervention of the plurality of servers 150 and 160. As discussed herein, the electronic devices 110 to 140 may also be referred to as transceiver devices.

Figure 2:
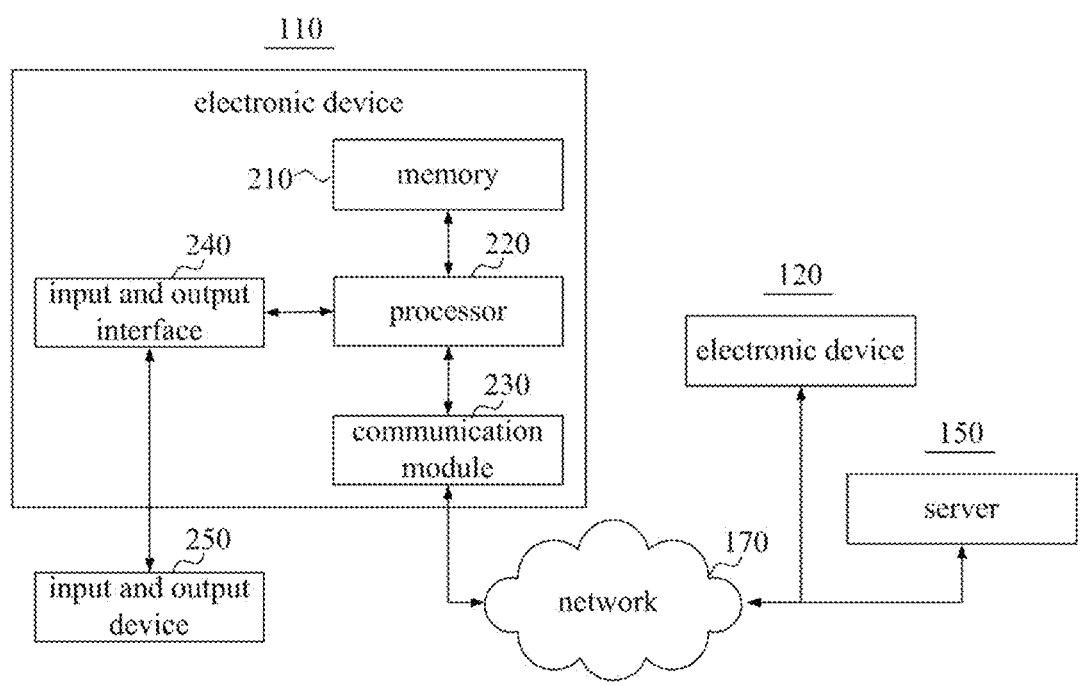
FIG. 2 is a block diagram illustrating a configuration of an electronic device according to an example embodiment of inventive concepts.

FIG. 2 is a block diagram illustrating a configuration of an electronic device in an example embodiment of inventive concepts. In FIG. 2, an example embodiment is exemplified as one electronic device is an electronic device 110 of FIG. 1.

The electronic device 110 may include a memory 210, a processor 220, a communication module 230, and an input and output interface 240. The memory 210 may be a tangible or non-transitory computer-readable recording medium and may include a permanent mass storage device such as a random access memory (RAM), a read only memory (ROM), and/or a disc drive. Also, the memory 210 may store an OS and at least one program code (e.g., a code for a browser or an application installed and driven in the electronic device 110). These software components may be loaded from a computer-readable recording medium, which is independent of the memory 210, using a drive mechanism. This computer-readable recording medium may include computer-readable recording media such as a floppy drive, a disc, a tape, a digital versatile disc/compact disc-ROM (DVD/CD-ROM) drive, and a memory card. In another example embodiment, the software components may be loaded into the memory 210 through the communication modules 230, rather than a computer-readable recording medium. For example, at least one program may be loaded into the memory 210 based on a program installed by files provided through the network 170 from developers.

The processors 220 may be configured to process instructions of one or more computer programs by performing basic arithmetic, logic, and input and output operations. The instruction may be provided to the processor 220 by the memory 210 or the communication module 230. For example, the processor 220 may be configured to execute an instruction received based on program code stored in a storage device such as the memory 210.

The communication module 230 may provide a function such that the electronic device 110 and another electronic device (e.g., an electronic device 120) or the electronic device 110 and the server 150 communicate with each other through the network 170. For example, a real-time transport protocol (RTP) packet generated by the processor 220 of the electronic device 110 based on a program code stored in a recording device such as the memory 210 may be transmitted to the electronic device 120 through the network 170 under control of the communication module 230. In contrast, an RTP packet transmitted from the electronic device 120 may be received through the network 170 or the communication module 230 and may then be sent to the processor 220 or the memory 210.

The input and output interface 240 may be a means for interfacing with the input and output device 250. For one example, the input device may include a device such as a keyboard or a mouse. The output device may include a device such as a display for displaying a communication session of an application. For another example, the input and output interface 240 may be a means for interfacing with a device, such as a touch screen, in which an input function and an output function are integrated into one. Specifically, in processing an instruction of a computer program loaded into the memory 210, the processor 220 of the electronic device 110 may display a service screen and/or content, configured using data provided from the server 150 or the electronic device 120, on a display of the electronic device 110 through the input and output interface 240.

Also, in other example embodiments, the electronic device 110 may include more components than those shown in FIG. 2. However, it is unnecessary to describe or illustrate most conventional components in elaborate detail. For example, the electronic device 110 may be implemented to include at least some of components of the above-mentioned input and output device 250 or may further include other components such as a transceiver, a global positioning system (GPS) module, a camera, and/or various sensors.

There may be a transmitting end and a receiving end in view of one packet data. In this case, one terminal system may be the transmitting end and may simultaneously be the receiving end. For example, the electronic device 110 may include all of components for the transmitting end and components for the receiving end.

Figure 3:
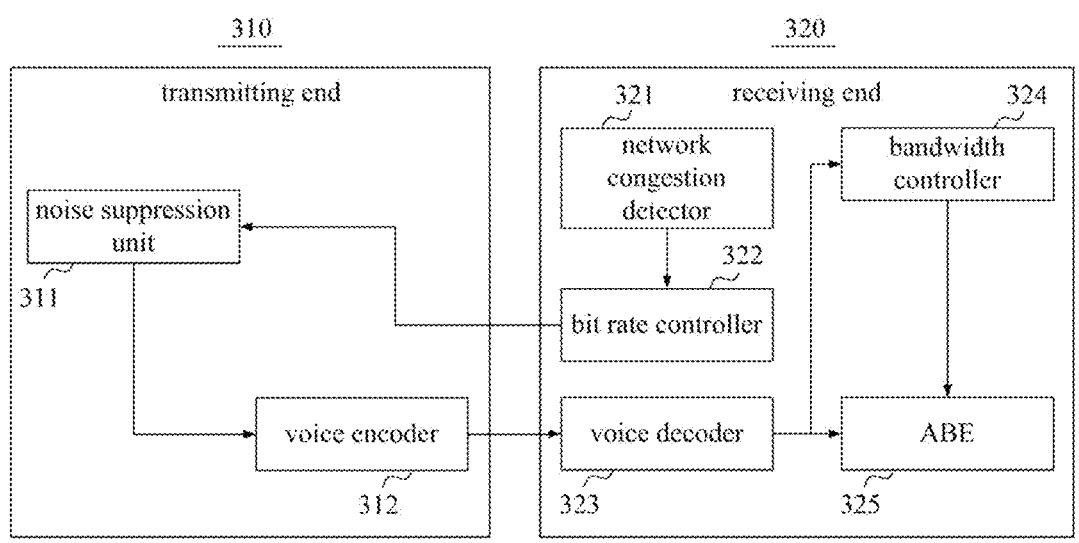
FIG. 3 is a block diagram illustrating voice over internet protocol (VoIP) communication between electronic devices according to an example embodiment of inventive concepts.

FIG. 3 is a block diagram illustrating voice over internet protocol (VoIP) communication between electronic devices according to an example embodiment of inventive concepts. FIG. 3 illustrates components, which may be included in a transmitting end 310 and a receiving end 320 in transmitting packet data, sent from the transmitting end 310 of a first terminal system (or a transmitting-end electronic device), to the receiving end 320 of a second terminal system (or a receiving-end electronic device).

In this case, as shown in FIG. 3, the transmitting end 310 may include a noise suppression unit 311 and a voice encoder 312. The receiving end 320 may include a network congestion detector 321, a bit rate controller 322, a voice decoder 323, a bandwidth controller 324, and an artificial bandwidth extension (ABE) module/unit 325. In this case, although a transmitting end of the transmitting-end electronic device and a receiving end of the receiving-end electronic device are not illustrated in FIG. 3, the receiving end of the transmitting-end electronic device and the transmitting end of the receiving-end electronic device may be implemented to perform the same or substantially the same function as the transmitting end 310 and the receiving end 320 of FIG. 3.

In this case, the components described with reference to FIG. 3 may be implemented to be included in one or more processors 220 of an electronic device 110 described with reference to FIG. 2 such that the one or more processors 220 perform corresponding functions of the components. For example, these functions of the components of the FIG. 3 may be performed, based on an operating system (OS) and at least one program code included in a memory 210 of FIG. 2, by the processor 220.

The transmitting-end electronic device and the receiving-end electronic device may communicate packet data with each other during a call session established between the transmitting-end electronic device and the receiving-end electronic device. Hereinafter, a description will be given of an example in which the transmitting end 310 of the transmitting electronic device sends packet data to the receiving end 320 of the receiving-end electronic device during a call session.

The network congestion detector 321 of the receiving end 320 may detect network congestion based on packet data received from the transmitting end 310. Information about the network congestion may be measured and/or detected using packet data sent from the transmitting end 310 (e.g., using a delay based on a time when packet data are sent and a time when packet data are received).

The bit rate controller 322 of the receiving end 320 may control a bit rate for the transmitting end 310 based on a degree of the detected network congestion. For example, if the network congestion is detected during a call session, the bit rate controller 322 may generate a value where the degree of the network congestion is quantified. If the generated value is greater than a threshold value, then the bit rate controller 322 may decrease the bit rate. If the generated value is less than the threshold value, then the bit rate controller 322 may increase the bit rate. If the generated value is equal to the threshold, then the bit rate controller 322 may maintain the bit rate.

In this case, the controlled bit rate may be sent from the receiving end 320 to the transmitting end 310. The sending of the controlled bit rate may be performed by a transmit and receive controller (not shown), which may be further included in the receiving end 320 or a receiving-end electronic device (or a process of the receiving-end electronic device). In this case, receiving the controlled bit rate, the transmitting end 310 may generate and send packet data at the received bit rate and may send the generated packet data to the receiving end 320. In other words, if network congestion of a threshold level or more is detected, then the bit rate controller 322 may decrease a bit rate of packet data to be generated and transmitted from the transmitting end 310 to reduce a size of the packet data. If network congestion is not detected, then the bit rate controller 322 may increase the bit rate of the packet data to improve quality of voice call.

The bandwidth controller 324 of the receiving end 320 may determine whether to perform bandwidth extension while a call session is maintained, based on a bit rate of the received packet data. For example, if packet data are received at a bit rate decreased based on network congestion detected during the call session (e.g., if a bandwidth is decreased to a narrow band (NB)), then the bandwidth controller 324 turns on the ABE 325 to synthesize sound quality of a standard definition (SD) voice as sound quality of a high definition (HD) voice.

In the related art, ABE is only turned on (or is activated) before making (prior to initiation of) a call with a called party for the called party who makes a call with a calling party through an SD voice. In the related art, the turning on/off of the ABE may not be determined dynamically. However, in example embodiments of inventive concepts, if a bandwidth is reduced based on adjustment of a bit rate at the same time as adaptively adjusting the bit rate based on a state of a network, then this bandwidth reduction may be suppressed and/or concealed to a user by dynamically turning on (or activating) the ABE 325 during a call session.

If network congestion is not detected after a network state becomes relatively good, then a bandwidth may be increased to a wideband (WB) as a bit rate is adaptively adjusted. In this case, the bandwidth controller 324 may suppress and/or prevent unnecessary calculation by dynamically turning off (or deactivating) the ABE 325 during a call session.

The noise suppression unit 311 of the transmitting end 310 may be optionally included in the transmitting end 310, if necessary. This noise suppression unit 311 may select a mode for noise suppression by comparing the bit rate controlled and received from the receiving end 320 with a bit rate threshold set or preset for a NB. Modes for noise suppression may be modes of different degrees of noise suppression. For example, if the transmitting end 310 sends packet data at a bit rate for an NB, then the noise suppression unit 311 may improve the quality of voice call by generating packet data by performing maximal noise suppression through an aggressive noise suppression mode. Also, if the transmitting end 310 sends packet data at a bit rate for WB, then the noise suppression unit 311 may reduce an amount of calculation by suppressing a noise at a proper level through a moderate noise suppression mode.

The voice encoder 312 of the transmitting end 310 may generate packet data by encoding voice data based on the bit rate controlled and received from the receiving end 320. Herein, the voice data may be data in which a noise is suppressed based on the mode selected by the noise suppression unit 311.

The packet data generated through the voice encoder 312 of the transmitting end 310 may be sent from the transmitting end 310 to the receiving end 320.

The receiving of the bit rate described above may be performed by a bit rate receiver (not shown), which may be further included in the transmitting end 310 or a transmitting-end electronic device (or a processor of the transmitting-end electronic device). The sending of the packet data may be performed by a packet data transmitter (not shown), which may be further included in the transmitting end 310 or the transmitting-end electronic device (or the processor of the transmitting-end electronic device).

The voice decoder 323 of the receiving end 320 may decode the received packet data into voice data. The decoded voice data may be provided to a user of the receiving-end electronic device in the form of being output through an output device such as a speaker, which may be included in the receiving-end electronic device.

Figure 4:
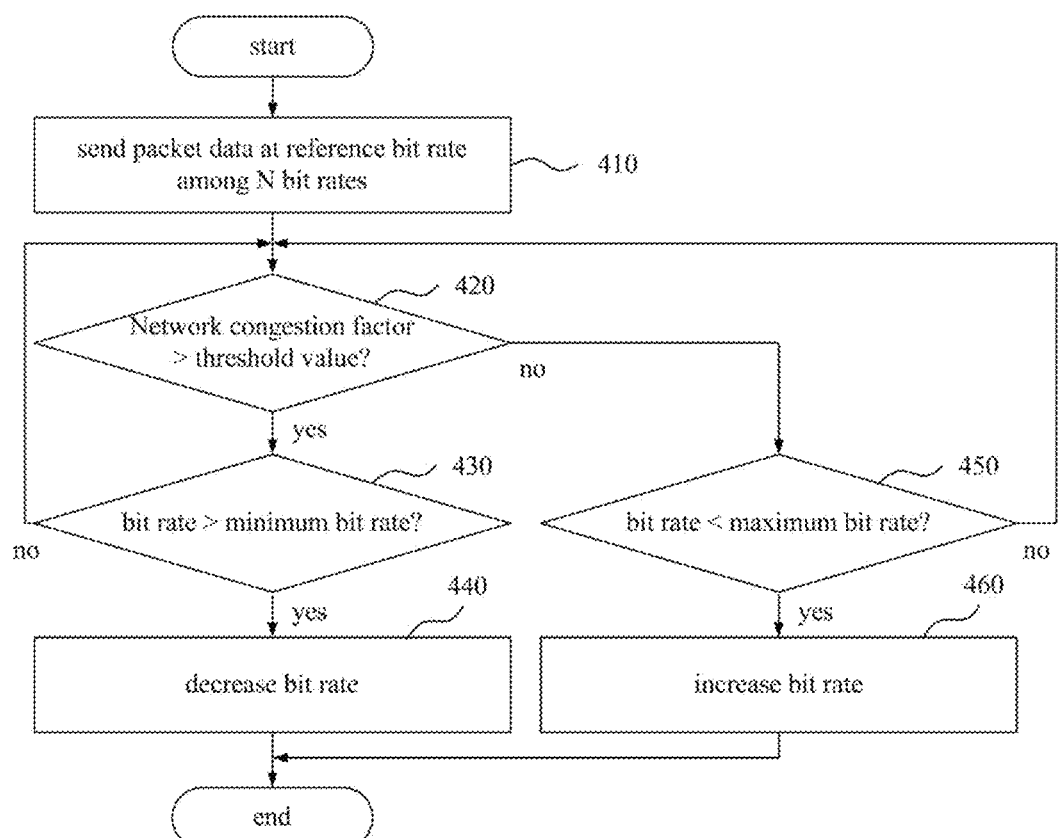
FIG. 4 is a flowchart illustrating a method for controlling a bit rate according to an example embodiment of inventive concepts.

FIG. 4 is a flowchart illustrating a method for controlling a bit rate according to an example embodiment of inventive concepts.

Referring to FIG. 4, in step 410, a transmitting-end electronic device may send packet data to a transmitting-end electronic device at a reference bit rate among N bit rates. In this case, the receiving-end electronic device receiving the packet data may detect network congestion based on the received packet data, and may generate a network congestion factor as information about the network congestion.

In step 420, the receiving-end electronic device may compare the network congestion factor with a threshold value. If the network congestion factor is greater than the threshold value, then the receiving-end electronic device may perform step 430.

In step S430, the receiving-end electronic device may compare a current bit rate with a threshold minimum bit rate. If the current bit rate is greater than the threshold minimum bit rate, then the receiving-end electronic device may perform step 440. If the current bit rate is less than or equal to the threshold minimum bit rate, then the receiving-end electronic device may perform step 420 again.

In step 440, the receiving-end electronic device may decrease a bit rate. In other words, for example, if the network congestion factor is greater than the threshold value in step 420, the receiving-end electronic device may recognize that network congestion is detected. Also, although a network is congested, since the at least threshold minimum bit rate for voice call should be maintained, the receiving-end electronic device may compare the current bit rate with the threshold minimum bit rate in step 430 such that the current bit rate is not less than or equal to the threshold minimum bit rate. Therefore, if the network is congested and if the current bit rate is greater than the threshold minimum bit rate, then the receiving-end electronic device may decrease a bit rate for the transmitting-end electronic device to reduce and/or minimize deterioration in sound quality.

Still referring to FIG. 4, in step 450, the receiving-end electronic device may compare the current bit rate with a threshold maximum bit rate. If the current bit rate is less than the threshold maximum bit rate, the receiving-end electronic device may perform step 460. Step 450 may be performed if the network congestion factor is less than or equal to the threshold value. In other words, for example, if network congestion is not detected in step 420, then the receiving-end electronic device may first determine whether the current bit rate is less than the threshold maximum bit rate before increasing the current bit rate. If the current bit rate is greater than or equal to the threshold maximum bit rate, then the receiving-end electronic device may perform step 420 again since the receiving-end electronic device does not increase the current bit rate any longer.

In step 460, the receiving-end electronic device may increase the bit rate. As such, if the network is not congested and if the current bit rate is less than the threshold maximum bit rate, then the receiving-end electronic device may increase the current bit rate. The transmitting-end electronic device may adaptively send packet data using the adjusted bit rate according to a network state.

This control of the bit rate of FIG. 4 may be performed by the bit rate controller 322 described with reference to FIG. 3.

Figure 5:
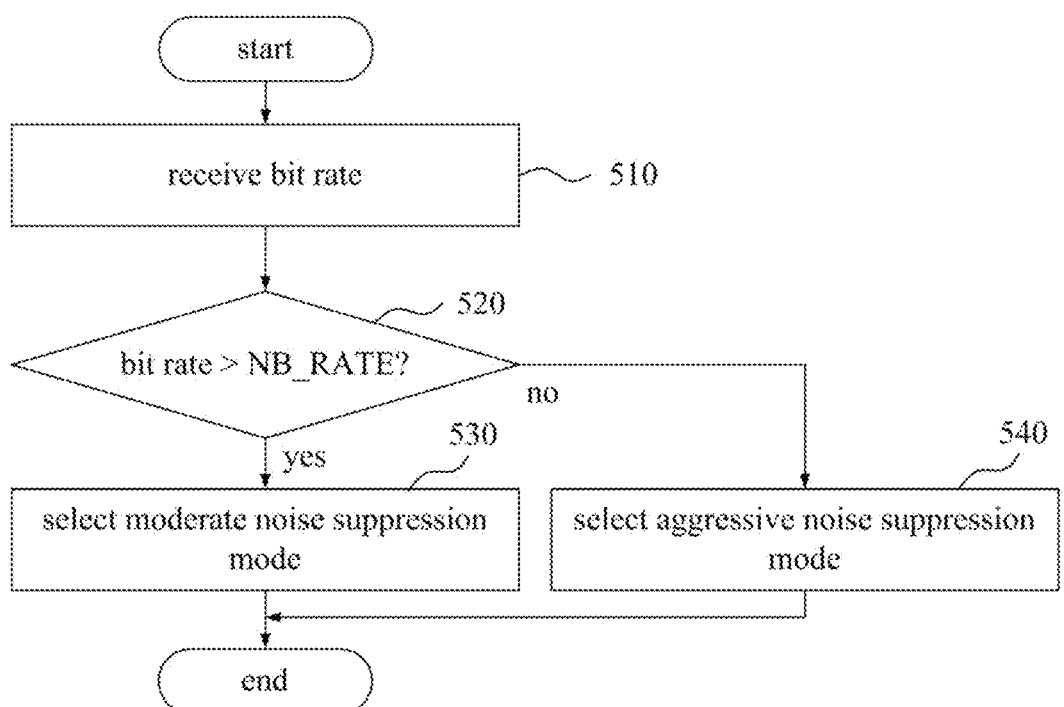
FIG. 5 is a flowchart illustrating a method for selecting a mode for noise suppression according to an example embodiment of inventive concepts.

FIG. 5 is a flowchart illustrating a method for selecting a mode for noise suppression according to an example embodiment of inventive concepts.

Referring to FIG. 5, in step 510, a transmitting-end electronic device may receive a bit rate. The received bit rate may be a bit rate which is controlled by the bit rate controller 322 described with reference to FIG. 3, and is then received from a receiving end 320 of FIG. 3.

In step 520, the transmitting-end electronic device may compare the received bit rate with a threshold bit rate NB_RATE set or preset for the narrow band (NB). If the received bit rate is greater than the threshold bit rate NB_RATE, then the transmitting-end electronic device may perform step 530. If the received bit rate is less than and equal to the threshold bit rate NB_RATE, then the transmitting-end electronic device may perform step 540. That the bit rate is greater than the threshold bit rate NB_RATE may mean that packet data are generated and sent in the wideband (WB). In contrast, that the bit rate is less than or equal to the threshold bit rate NB_RATE may mean that packet data are generated and sent in the NB.

In step 530, the transmitting-end electronic device may select a moderate noise suppression mode.

In step 540, the transmitting-end electronic device may select an aggressive noise suppression mode. The aggressive noise suppression mode may be a mode where a level of suppressing a noise is higher than the moderate noise suppression mode. In other words, for example, if packet data are generated and transmitted at a bit rate for the WB, then the transmitting-end electronic device may select the moderate noise suppression mode. If packet data are generated and transmitted at a bit rate for the NB, then the transmitting-end electronic device may select the aggressive noise suppression mode.

The selection of the mode for noise suppression may be used as another method for suppressing and/or concealing bandwidth reduction based on a bit rate controlled based on a network situation. In other words, for example, noise is maximally suppressed if packet data are sent in the NB through bandwidth reduction due to network congestion such that the reduction of sound quality is suppressed and/or prevented from being recognized by the user although he or she makes a voice call with a counterpart in the NB, thus suppressing and/or concealing bandwidth reduction.

This mode selection of FIG. 5 may be performed by the noise suppression unit 311 described with reference to FIG. 3.

Figure 6:
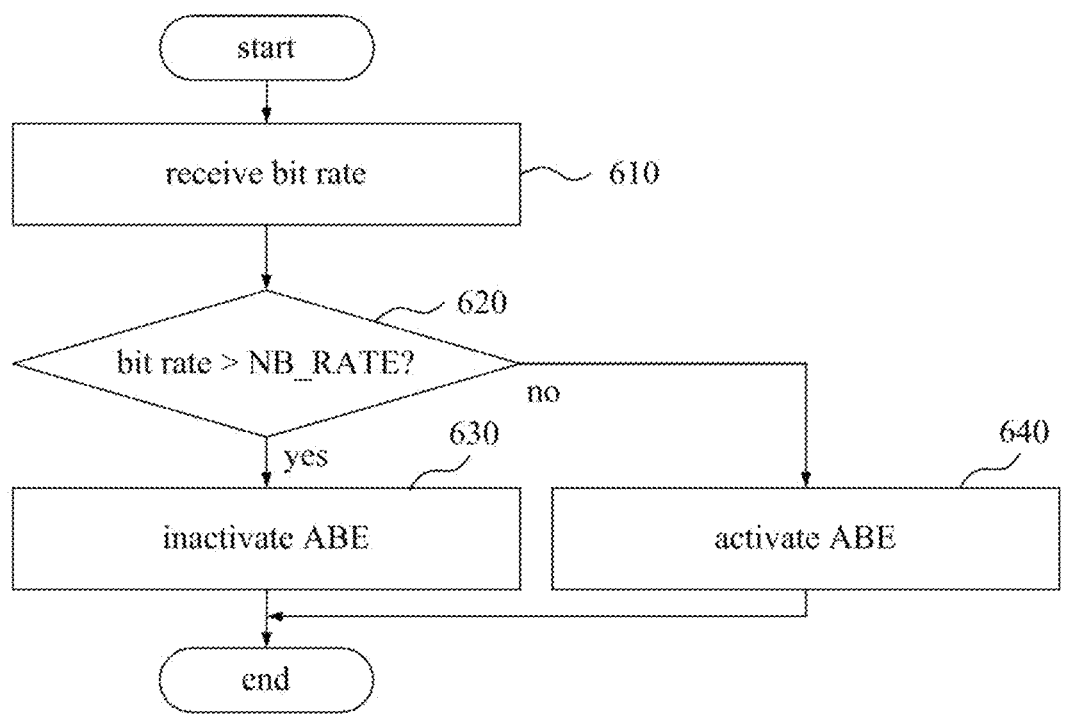
FIG. 6 is a flowchart illustrating a method for determining whether to perform bandwidth extension according to an example embodiment of inventive concepts.

FIG. 6 is a flowchart illustrating a method for determining whether to perform bandwidth extension according to an example embodiment of inventive concepts. Whether to perform the bandwidth extension may be determined by a bandwidth controller 324 of a receiving end 320 of FIG. 3.

Referring to FIG. 6, in step 610, the bandwidth controller 324 may receive a bit rate. Herein, the bit rate may be a bit rate of packet data received by the receiving-end electronic device.

In step 620, the bandwidth controller 324 may compare the received bit rate with a threshold bit rate NB_RATE set or preset for the NB.

If the received bit rate is greater than the threshold bit rate NB_RATE, then the bandwidth controller 324 may perform step 630. If the received bit rate is less than or equal to the threshold bit rate NB_RATE, then the bandwidth controller 324 may perform step 640. That the received bit rate is greater than the threshold bit rate NB_RATE may mean that packet data are sent in the WB. That the received bit rate is less than or equal to the threshold bit rate NB_RATE may mean that packet data are sent in the NB.

Therefore, if the packet data are sent in the WB, then the bandwidth controller 324 may deactivate an ABE (e.g., an ABE 325 of FIG. 3). If the packet data are sent in the NB, then the bandwidth controller 324 may activate the ABE and may synthesize sound quality of an SD voice as sound quality of an HD voice to suppress and/or conceal bandwidth reduction. If the ABE is deactivated, then a signal of a voice decoder (e.g., a voice decoder 323 of FIG. 3), which may be included in the receiving-end electronic device may pass through the ABE without change. For example, the ABE may be implemented in the form of being embedded in the voice decoder to extend a bandwidth using a signal output from the voice decoder. In this case, if the packet data are sent in the WB, then the receiving-end electronic device may control the ABE such that a signal output from the voice decoder passes through the ABE without change.

Figure 7:
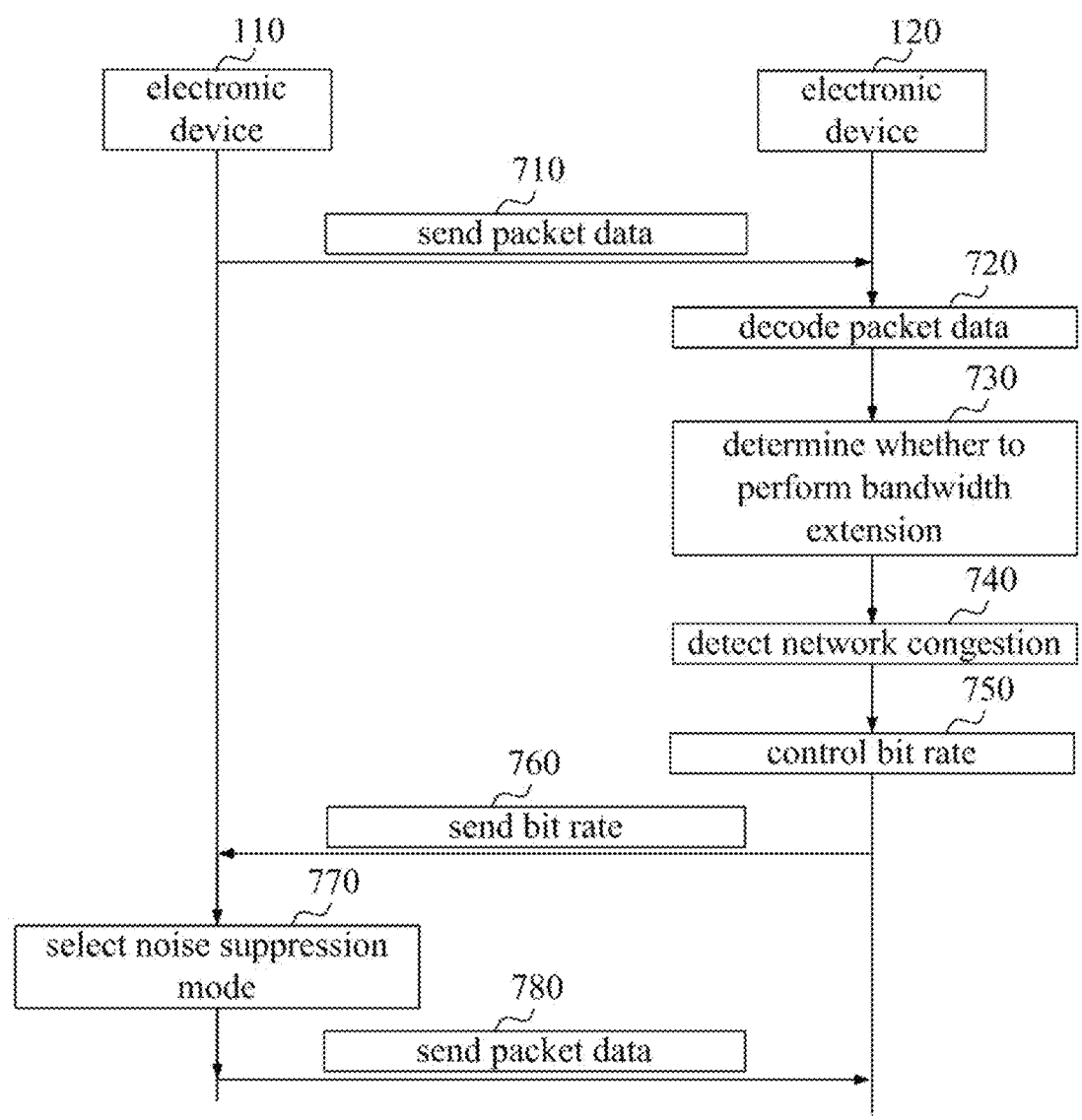
FIG. 7 is a signal sequence diagram illustrating a voice call method according to an example embodiment of inventive concepts.

FIG. 7 is a signal sequence diagram illustrating a voice call method according to an example embodiment of inventive concepts. FIG. 7 illustrates a voice call process between an electronic device 110 and an electronic device 120.

Referring to FIG. 7, in step 710, the electronic device 110 may send packet data to the electronic device 120. In this case, initial packet data in a communication session may be generated and sent at a reference bit rate among N bit rates.

In step 720, the electronic device 120 may decode the packet data.

In step 730, the electronic device 120 may determine whether to perform bandwidth extension. In this case, whether to perform the bandwidth extension may be determined based on a bit rate of the received packet data. A more specific example is described above with reference to FIG. 6.

In step 740, the electronic device 120 may detect network congestion. The network congestion may be detected using the packet data received in step 710. For example, the electronic device 120 may generate a network congestion factor as information about the network congestion based on a time when the received data are sent and a time when the received data are received.

In step 750, the electronic device 120 may control a bit rate. For example, the electronic device 120 may adjust a value of the bit rate based on the received information about the network congestion. This control of the bit rate is described in detail above with reference to FIG. 4.

In step 760, the electronic device 120 may send the bit rate to the electronic device 110.

In step 770, the electronic device 110 may select a noise suppression mode. For example, the electronic device 110 may select the noise suppression mode based on the bit rate received in step 760. A noise of voice data may be suppressed based on this noise suppression mode.

In step 780, the electronic device 110 may send packet data to the electronic device 120. These packet data may be generated and sent based on the bit rate received in step 760 to be different from the packet data generated and sent in step 710 based on the reference bit rate.

An example embodiment is exemplified as the electronic device 110 sends the packet data to the electronic device 120. However, the scope and spirit of inventive concepts may not be limited thereto. For example, the electronic device 120 sends packet data to the electronic device 110 through a similar process. For example, the electronic device 120 may generate a packet to be sent to the electronic device 110 based on a bit rate controlled by the electronic device 110. The electronic device 110 may determine whether to perform bandwidth extension based on a bit rate of packet data sent from the electronic device 120.

Figure 8:
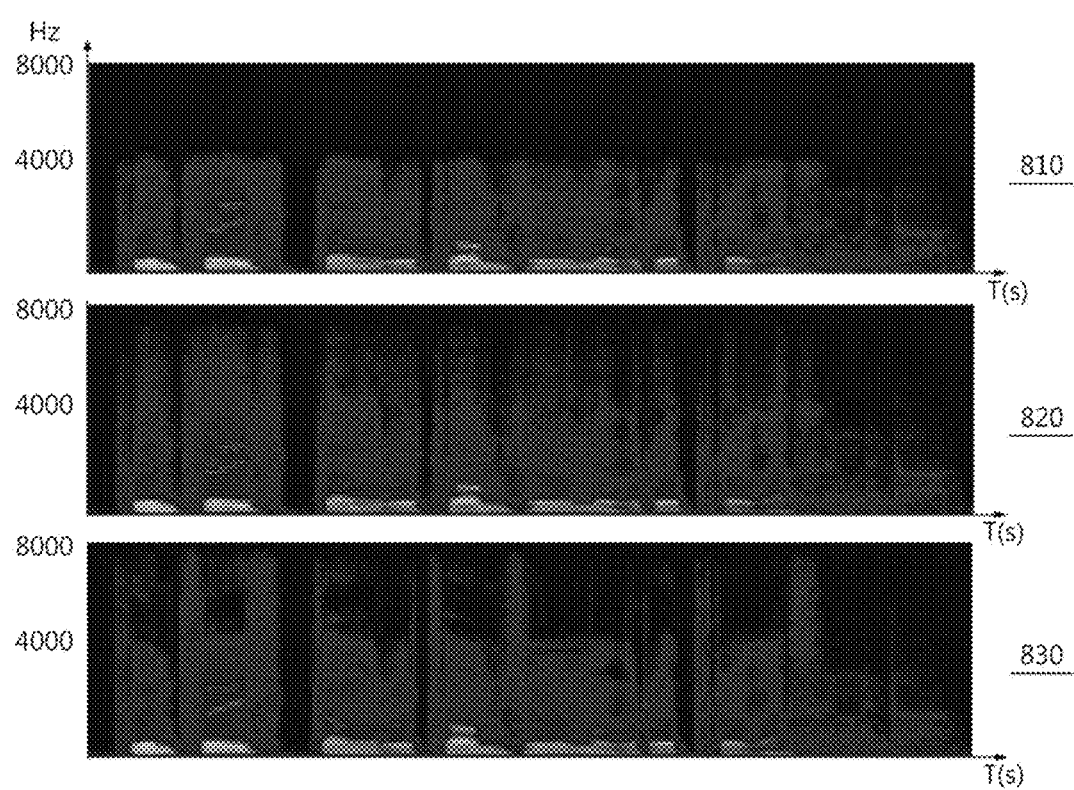
FIG. 8 is a drawing illustrating example graphs for comparing frequencies over time for each according to an example embodiment of inventive concepts.

FIG. 8 is a drawing illustrating example graphs for comparing frequencies over time for each bandwidth according to an example embodiment of inventive concepts. In each of a first graph 810, a second graph 820, and a third graph 830, an x-axis represents time and a y-axis represents frequencies Hertz (Hz).

In this case, the first graph 810 represents frequencies over time for a signal in the NB. The third graph 830 represents frequencies over time for a signal in the WB.

The second graph 820 represents frequencies over time for a signal in a bandwidth extended through bandwidth extension based on activation of ABE in the NB. In this case, it may be known that a signal of the second graph 820 has a frequency band similar to a signal of the third graph 830.

In other words, for example, although a change of sound quality (or bandwidth reduction) from HD voice to SD voice occurs during a call connection based on a network state, in example embodiments of inventive concepts, the system may generate a signal similar to a signal in the WB by adaptively activating ABE based on a network state to suppress and/or conceal bandwidth reduction.

The description above is given of example embodiments in which the receiving-end electronic device controls the bit rate for the transmitting-end electronic device. However, the scope and spirit of inventive concepts should not be limited thereto. According to another example embodiment, the transmitting-end electronic device may control the bit rate. For example, the receiving-end electronic device may detect network congestion and may send information about the network congestion (e.g., a network congestion factor) to the transmitting-end electronic device. The transmitting-end electronic device may compare the received information about the network congestion with a threshold value and may control a bit rate accordingly.

Figure 9:
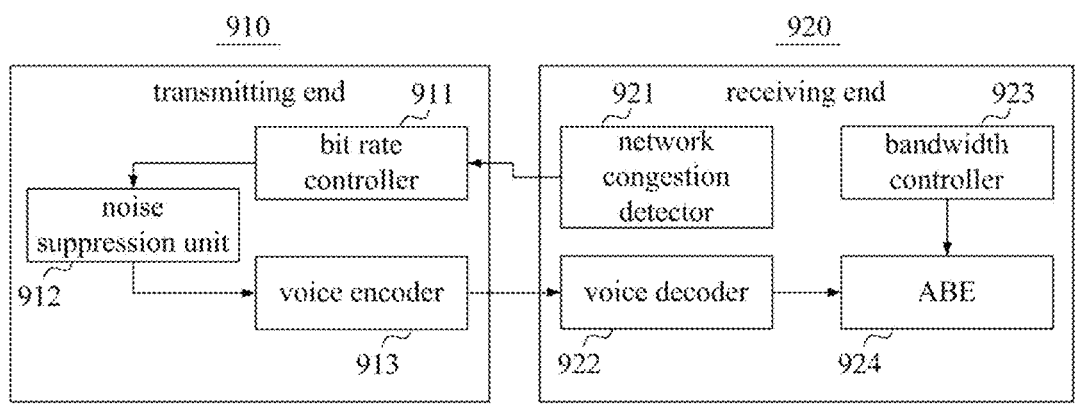
FIG. 9 is a block diagram illustrating VoIP communication between electronic devices according to another example embodiment of inventive concepts.

FIG. 9 is a block diagram illustrating VoIP communication between electronic devices according to another example embodiment of inventive concepts. FIG. 9 illustrates components which may be included in a transmitting end 910 and a receiving end 920 in sending packet data, sent from the transmitting end 910 of a first terminal system (or a transmitting-end electronic device), to the receiving end 920 of a second terminal system (or a receiving-end electronic device).

In this case, as shown in FIG. 9, the transmitting end 910 may include a bit rate controller 911, a noise suppression unit 912 and a voice encoder 913. The receiving end 920 may include a network congestion detector 921, a voice decoder 922, a bandwidth controller 923, and an artificial bandwidth extension (ABE) 924. In this case, although a transmitting end of the transmitting-end electronic device and a receiving end of the receiving-end electronic device are not illustrated in FIG. 9, the transmitting end of the transmitting-end electronic device and the receiving end of the receiving-end electronic device may be implemented to perform the same or substantially the same function as the transmitting end 910 and the receiving end 920 of FIG. 3.

In this case, the components described with reference to FIG. 9 may be implemented to be included in a processor 220 of an electronic device 110 described with reference to FIG. 2 such that the processor 220 performs corresponding functions of the components. For example, these functions of the components of FIG. 9 may be performed by the processor 220 based on an operating system (OS) and at least one program code included in a memory 210 of FIG. 2.

The transmitting-end electronic device and the receiving-end electronic device may communicate packet data with each other during a call session established between the transmitting-end electronic device and the receiving-end electronic device. Hereinafter, a description will be given of an example in which the transmitting end 910 of the transmitting electronic device sends packet data to the receiving end 90 of the receiving-end electronic device during a call session.

The network congestion detector 921 of the receiving end 920 may detect network congestion based on packet data received from the transmitting end 910. For example, information about the network congestion may be measured and/or detected using packet data sent from the transmitting end 910 (e.g., using a delay based on a time when packet data are sent and a time when packet data are received) by the receiving end 920.

In this case, the information about the network congestion (e.g., a network congestion factor) may be sent from the receiving end 920 to the transmitting end 910. For this purpose, the receiving end 920 or the receiving-end electronic device (or a processor of the receiving-end electronic device) may further include a transmit and receive controller (not shown).

The bit rate controller 911 of the transmitting end 910 may control a bit rate for transmitting the packet data using the received information about the network congestion (e.g., the network congestion factor). For example, if a network congestion factor, which is a value where a degree of the network congestion is quantified, is greater than a threshold value (or a maximum bit rate), then the bit rate controller 911 may decrease a bit rate. If the network congestion factor is less than the threshold value (or a minimum bit rate), then the bit rate controller 911 may increase the bit rate. If the network congestion factor is equal to the threshold value (or is between the minimum bit rate and the maximum bit rate), then the bit rate controller 911 may maintain the bit rate.

The noise suppression unit 912 of the transmitting end 910 may be optionally included in the transmitting end 910, if necessary. This noise suppression unit 912 may select a mode for noise suppression by comparing a bit rate with a threshold bit rate set or preset for the NB. Modes for noise suppression may be modes of different degrees of noise suppression.

The voice encoder 913 of the transmitting end 910 may generate packet data by encoding voice data based on the controlled bit rate. Herein, the voice data may be data in which a noise is suppressed based on the mode selected by the noise suppression unit 912.

The packet data generated through the voice encoder 913 of the transmitting end 910 may be sent from the transmitting end 910 to the receiving end 920.

The voice decoder 922 of the receiving end 920 may decode the received packet into voice data. The decoded voice data may be sent to a user of the receiving-end electronic device in the form of being output through an output device such as a speaker which may be included in the receiving-end electronic device.

The bandwidth controller 923 of the receiving end 920 may determine whether to perform bandwidth extension while a call session is maintained, based on a bit rate of the received packet data. For example, if packet data are received at a bit rate decreased based on network congestion detected during the call session (e.g., if a bandwidth is decreased to the NB), then the bandwidth controller 923 turns on the ABE 924 to synthesize sound quality of standard definition (SD) voice again as sound quality of high definition (HD) voice.

As such, according to example embodiments of inventive concepts, the system may suppress and/or conceal bandwidth reduction, which occurs during a VoIP call connection, using an ABE algorithm for synthesizing sound quality of an HD voice again from sound quality of an SD voice, thus improving VoIP call quality.

Also, the system may suppress and/or conceal this bandwidth reduction by selecting a noise suppression mode.

As discussed similarly above, one or more example embodiments may be realized by hardware elements, software elements and/or combinations thereof. For example, the devices and components illustrated in the example embodiments of inventive concepts may be implemented in one or more general-use computers or special-purpose computers, such as a processor, a controller, an arithmetic logic unit (ALU), a digital signal processor, a microcomputer, a field programmable array (FPA), a programmable logic unit (PLU), a microprocessor or any device which may execute instructions and respond. A processing unit may implement an operating system (OS) or one or software applications running on the OS. Further, the processing unit may access, store, manipulate, process and generate data in response to execution of software. It will be understood by those skilled in the art that although a single processing unit may be illustrated for convenience of understanding, the processing unit may include a plurality of processing elements and/or a plurality of types of processing elements. For example, the processing unit may include a plurality of processors or one processor and one controller. Also, the processing unit may have a different processing configuration, such as a parallel processor.

Software may include computer programs, codes, instructions or one or more combinations thereof and may configure a processing unit to operate in a desired manner or may independently or collectively control the processing unit. Software and/or data may be permanently or temporarily embodied in any type of machine, components, physical equipment, virtual equipment, computer storage media or units or transmitted signal waves so as to be interpreted by the processing unit or to provide instructions or data to the processing unit. Software may be dispersed throughout computer systems connected via networks and may be stored or executed in a dispersion manner. Software and data may be recorded in one or more computer-readable storage media.

Methods according to one or more example embodiments of inventive concepts may be implemented with program instructions which may be executed through various computer means and may be recorded in a tangible or non-transitory computer-readable media. The media may also include, alone or in combination with the program instructions, data files, data structures, and the like. The program instructions recorded in the media may be designed and configured specifically for the example embodiments of inventive concepts or be known and available to those skilled in computer software. Computer-readable media include magnetic media such as hard disks, floppy disks, and magnetic tape; optical media such as compact disc-read only memory (CD-ROM) disks and digital versatile discs (DVDs); magneto-optical media such as floptical disks; and hardware devices that are specially configured to store and perform program instructions, such as read-only memory (ROM), random access memory (RAM), flash memory, and the like. Program instructions include both machine codes, such as produced by a compiler, and higher level codes that may be executed by the computer using an interpreter. The described hardware devices may be configured to act as one or more software modules to perform the operations of the above-described example embodiments of inventive concepts, or vice versa.

While a few example embodiments have been shown and described with reference to the accompanying drawings, it will be apparent to those skilled in the art that various modifications and variations can be made from the foregoing descriptions. For example, adequate effects may be achieved even if the foregoing processes and methods are carried out in different order than described above, and/or the aforementioned elements, such as systems, structures, devices, or circuits, are combined or coupled in different forms and modes than as described above or be substituted or switched with other components or equivalents.

According to one or more example embodiments, methods and/or systems may improve VoIP call quality by suppressing and/or concealing bandwidth reduction, which occurs during a VoIP call connection, using an ABE algorithm for synthesizing sound quality of HD voice again from sound quality of SD voice.

Therefore, other implements, other embodiments, and equivalents to claims are within the scope of the following claims.

What is claimed is:

1. A method for dynamic bandwidth extension during a call session between a first transceiver device and a second transceiver device, the method comprising:

comparing, at the first transceiver device, a bit rate of
received packet data with a threshold bit rate, the bit
rate of received packet data controlled based on a
degree of network congestion between the first transceiver device and the second transceiver device; and
determining, at the first transceiver device, whether to
perform bandwidth extension during the call session
based on the comparison; wherein
noise suppression is applied to subsequent packet data
transmissions to the first transceiver device based on
a comparison between a bit rate for the subsequent
packet data transmissions and a bit rate for narrow
band transmissions, and
a maximum noise suppression level is applied to the
subsequent packet data transmissions in response to
the bit rate for the subsequent packet data transmissions being less than the bit rate for narrow band
transmissions.

2. The method of claim 1, wherein
the received packet data is transmitted from the second
transceiver device to the first transceiver device; and
the method further includes
detecting the degree of network congestion based on
the received packet data,
determining, by the first transceiver device, the bit rate
for the subsequent packet data transmissions by the
second transceiver device based on the degree of
network congestion,
sending, by the first transceiver device, the bit rate for
the subsequent packet data transmissions to the second transceiver device, and
receiving, at the first transceiver device, the subsequent
packet data transmissions from the second transceiver device at the bit rate for the subsequent packet
data transmissions.

3. The method of claim 2, further comprising:
generating, by the first transceiver device, a value quantifying the degree of network congestion; and wherein
the determining the bit rate for the subsequent packet data
transmissions includes
decreasing the bit rate for the subsequent packet data
transmissions in response to the value being greater
than a threshold value, and
increasing the bit rate for the subsequent packet data
transmissions in response to the value being less than
the threshold value.

4. The method of claim 1, further comprising:
controlling the bit rate of received packet data based on
the degree of network congestion; and
verifying the bit rate of received packet data based on
subsequent packet data received from the second transceiver device at the bit rate of received packet data.

5. The method of claim 1, further comprising:
detecting the degree of network congestion during the call
session;
generating information about the degree of network congestion; and
sending the information about the degree of network
congestion to the second transceiver device for controlling the bit rate for the subsequent packet data
transmissions during the call session based on the
information about the degree of network congestion.

6. The method of claim 1, further comprising:
extending a bandwidth by activating an artificial bandwidth extension (ABE) at the first transceiver device in
response to the bit rate of received packet data being
less than the threshold bit rate.

7. A method for dynamic bandwidth extension during a
call session between a first transceiver device and a second
transceiver device, the method comprising:
comparing, at the first transceiver device, a bit rate of
received packet data with a threshold bit rate, the bit
rate of received packet data controlled based on a
degree of network congestion between the first transceiver device and the second transceiver device;
determining, at the first transceiver device, whether to
perform bandwidth extension during the call session
based on the comparison; and
selecting a mode for suppressing noise in packet data
transmissions based on a comparison between the bit
rate of received packet data and a bit rate for narrow
band transmissions; wherein
the selecting selects a maximum noise suppression
level in response to the bit rate of received packet
data being less than the bit rate for narrow band
transmissions.

8. A method for dynamic bandwidth extension during a
call session between a first transceiver device and a second
transceiver device, the method comprising:
receiving, at the first transceiver device during the call
session, a bit rate for packet data transmissions to the
second transceiver device during the call session, the
bit rate controlled based on a degree of network congestion between the first transceiver device and the
second transceiver device;
generating, by the first transceiver device, packet data at
the bit rate;
selecting, by the first transceiver device, a mode for noise
suppression based on a comparison between the bit rate
and a threshold bit rate for narrow band transmissions,
wherein the selecting selects a maximum noise suppression mode in response to the bit rate being less than
the threshold bit rate; and
sending, by the first transceiver device, the packet data to
the second transceiver device; wherein
during the call session, the second transceiver device
determines whether to perform bandwidth extension
based on the bit rate of the packet data.

9. The method of claim 8, further comprising:
controlling, by the second transceiver device, the bit rate
based on the degree of network congestion; and
wherein the bit rate is received from the second transceiver device.

10. The method of claim 9, further comprising:
receiving information about the degree of network congestion from the second transceiver device during the
call session; and wherein
the controlling controls the bit rate based on the information.

11. The method of claim 10, wherein
the information about the degree of network congestion
includes a value of a factor quantifying the degree of
network congestion; and
the controlling the bit rate includes
decreasing the bit rate in response to the value of the
factor being greater than a threshold value, and
increasing the bit rate in response to the value of the
factor being less than the threshold value.

12. The method of claim 8, further comprising:
extending a bandwidth by activating an artificial bandwidth extension (ABE) in response to the bit rate being
less than a threshold bit rate for narrow band transmissions.

13. An electronic device, comprising:
a transceiver; and
one or more processors coupled to the transceiver, the one or more processors configured to execute computer-readable instructions, such that the one or more processors are configured to
compare, during a call session with at least one other electronic device, a bit rate of received packet data with a threshold bit rate, the bit rate of received packet data controlled based on a degree of network congestion between the electronic device and the at least one other electronic device, and
determine whether to perform bandwidth extension during the call session based on the comparison;
wherein noise suppression is applied to subsequent packet data transmissions from the at least one other electronic device to the electronic device based on a comparison between a bit rate for the subsequent packet data transmissions and a bit rate for narrow band transmissions; and
wherein a maximum noise suppression level is applied to the subsequent packet data transmissions in response to the bit rate for the subsequent packet data transmissions being less than the bit rate for narrow band transmissions.

14. The electronic device of claim 13, wherein
the one or more processors are configured to execute the computer-readable instructions such that the one or more processors are further configured to
detect the degree of network congestion based on the received packet data, and
determine the bit rate for the subsequent packet data transmissions from the at least one other electronic device based on the degree of network congestion; and
the transceiver is further configured to
send the bit rate for the subsequent packet data transmissions to the at least one other electronic device, and
receive the subsequent packet data transmissions from the at least one other electronic device at the bit rate for the subsequent packet data transmissions.

15. The electronic device of claim 14, wherein the one or more processors are configured to execute the computer-readable instructions such that the one or more processors are further configured to
generate a value quantifying the degree of network congestion;
decrease the bit rate for the subsequent packet data transmissions in response to the value being greater than a threshold value; and
increase the bit rate for the subsequent packet data transmissions in response to the value being less than the threshold value.

16. The electronic device of claim 13, wherein the one or more processors are configured to execute the computer-readable instructions such that the one or more processors are further configured to
control the bit rate of received packet data based on the degree of network congestion; and
verify the bit rate of received packet data based on subsequent packet data received from the at least one other electronic device at the bit rate of received packet data.

17. The electronic device of claim 13, wherein
the one or more processors are configured to execute the computer-readable instructions such that the one or more processors are further configured to
detect the degree of network congestion during the call session, and
generate information about the degree of network congestion; and
the transceiver is further configured to send the information about the degree of network congestion to the at least one other electronic device to control the bit rate for the subsequent packet data transmissions during the call session based on the information about the degree of network congestion.

18. The electronic device of claim 13, wherein the one or more processors are configured to execute the computer-readable instructions such that the one or more processors are further configured to extend a bandwidth for the call session by activating an artificial bandwidth extension (ABE) in response to the bit rate of received packet data being less than the threshold bit rate.

* * * * *